(12) United States Patent
Bill et al.

(10) Patent No.: US 6,346,870 B1
(45) Date of Patent: Feb. 12, 2002

(54) SOLENOID COIL DISPLACEMENT SENSOR SYSTEM

(75) Inventors: Martin Bill, Nohfelden (DE); Andreas Bereschka, Bousbach (FR)

(73) Assignee: Hydac Electronic GmbH, Saarbrucken (DE)

(*) Notice: Subject to any disclaimer, the term of this patent is extended or adjusted under 35 U.S.C. 154(b) by 0 days.

(21) Appl. No.: 09/446,248
(22) PCT Filed: Mar. 23, 1998
(86) PCT No.: PCT/EP98/01679
  § 371 Date: Dec. 20, 1999
  § 102(e) Date: Dec. 20, 1999
(87) PCT Pub. No.: WO98/59217
  PCT Pub. Date: Dec. 30, 1998

(30) Foreign Application Priority Data

Jun. 20, 1997 (DE) .......................................... 197 26 256

(51) Int. Cl.[7] ................................................ H01F 27/30
(52) U.S. Cl. ........................................ 336/198; 336/208
(58) Field of Search ................................ 336/130, 136, 336/198, 208, 192

(56) References Cited

U.S. PATENT DOCUMENTS

| 3,017,589 A | * | 1/1962 | Chass ........................... 336/136 |
| 3,138,772 A | * | 6/1964 | Persons, Jr. .................. 336/136 |
| 4,473,811 A | | 9/1984 | Schauble |

FOREIGN PATENT DOCUMENTS

| DE | 3925994 A1 | 2/1991 |
| DE | 19514891 A1 | 4/1996 |

OTHER PUBLICATIONS

IBM Technical Disclosure Bulletin, vol. 26, No. 6, Coaxial Transformer Bobbin, Nov. 1983.

* cited by examiner

Primary Examiner—Anh Mai
(74) Attorney, Agent, or Firm—Roylance, Abrams, Berdo & Goodman, L.L.P.

(57) ABSTRACT

A displacement sensor system for solenoid coils includes at least two primary coil windings arranged in line on a main coil body to form a primary winding. A secondary coil winding is arranged on top of each primary coil winding to form a secondary winding. This displacement sensor system is configured in such a way that it can be produced in an economical manner and with a reduced length.

15 Claims, 3 Drawing Sheets

SOLENOID COIL DISPLACEMENT SENSOR SYSTEM

FIELD OF THE INVENTION

The present invention relates to a displacement sensor system for solenoid coils comprising at least two coil windings arranged one behind the other in series on a main coil body.

BACKGROUND OF THE INVENTION

Displacement sensor systems for solenoid coils basically operate according to the transformer principle. Thus, an assembly of at least one primary winding, one secondary winding and one core rod is required. The core rod is generally connected with the plunger-like solenoid part of a solenoid coil and within the displacement sensor extending through the displacement distance to be measured. A pulsating auxiliary voltage is supplied to the primary winding of this arrangement. The secondary winding delivers an output signal in the form of voltage, which is modified corresponding to the displacement of the core rod. Using this basic concept, a positive signal indicating the passing of the output signal through a defined zero or neutral point can be provided when the core rod is displaced in one direction. To provide a negative signal indicating the other displacement direction, two secondary windings are required for realization of such arrangements.

DE 39 25 994 A discloses a displacement sensor system for solenoid coils according to the transformer principle. The displacement sensor system includes two coil windings wound on a main coil body and arranged one behind the other. The two coil windings are separated from one another by means of a central bridge member arranged approximately in the middle in longitudinal alignment on the main coil body. These windings make up a secondary winding. Over this pair of secondary windings and following insertion of a thin sheet between them, a pair of primary windings is laid. This pair of primary windings together form the primary winding in addition to or adjacent to the secondary winding. Using that arrangement, the mechanical toggle joinings of the start up windings and terminal end windings are as complicated as the mechanical swinging of the windings onto the relevant coil bodies, which leads to high production costs.

A transformer is described in U.S. Pat. No. 4,473,811 which uses an almost identical construction to the displacement sensor system of DE 39 25 994 A. This U.S. patent discloses a transformer with a main coil body on which a primary winding and a secondary winding are wound one over the other in each of its two sectors. Thus, the individual coils of the primary and secondary winding are connected in series.

Clark et al publication, "Coaxial Transformer Bobbin", IBM Technical Disclosure Bulletin, Vol. 26, No. 6, Nov. 1983, pages 2796–2797, XP002071893, discloses an arrangement of primary and secondary coils in which the secondary winding is arranged on an additional coil body surrounding the main coil body and contacting with the primary winding. The second exterior coil body is attachable from the side. The wires of primary and secondary coils do not intersect, so that the two coil bodies actually engage on one another, but are nonetheless slidable relative to one another. These two documents, however, provide no suggestion for the execution of or even for the simplification of the mechanical toggle joining of the starting point windings and the terminal end windings.

SUMMARY OF THE INVENTION

Objects of the present invention are to provide displacement sensor systems that can be manufactured at a lower cost, with a shortened structural length and in a simplified manner.

The foregoing objects are basically obtained by a displacement sensor system for a solenoid coil comprising a main coil body, first and second primary coil windings arranged one behind another on the main coil body forming a primary winding, and first and second secondary coil windings mounted over these first and second primary coil windings forming a secondary winding. A central bridge is in a longitudinal middle of the main coil body. The central bridge has diametrically opposing pairs of toggle pin points for starting points and terminal ends of the primary and secondary windings.

Since, on the middle bridge member, toggle joining points for the starting points and the terminal ends of coil windings of primary and secondary windings are present in pairs and arranged diametrically opposite one another, the toggle joints of the starting point windings and terminal end windings to be produced are mechanical. This consequently simplifies the mechanical swinging of the windings onto the relevant coil bodies.

As a result of the central arrangement of the contact points, the structural space required for the displacement sensor system is minimized. Preferably, the toggle joining points are formed of bearing journals which can be enveloped by winding wires. Since the relevant coil windings are arranged not one behind the other, but rather one over the other, the structural length of the displacement sensor system is shortened remarkably. Since the primary windings can be wound separately from the secondary windings, a complete winding for each coil body is possible, so that costly interruptions in the winding process are avoided.

With one preferred embodiment of the displacement sensor system, the primary winding is wound on the main coil body and the two secondary windings are wound on a separate coil body, which surrounds the main coil body and contacts with the primary windings. By this means, a displacement sensor system for a solenoid coil of small structure is obtained also in radial direction.

With another preferred embodiment of the displacement sensor system of the present invention, the second or additional coil body is formed of two body halves, which can be attached to the two ends of the main coil body with its two primary coil windings. Symmetrical construction is thus attained. The coil bodies comprise essentially three individual components, which simplifies the construction. Following assembly and mounting of the primary windings, the two body halves permit winding two secondary coil windings continuously on the second coil body, which lowers overall manufacturing costs.

With another preferred embodiment of the displacement sensor system of the present invention, the central bridge includes an open perforation in the form of a wire guide. Both sides of the central bridge have contact surfaces for the attachable body halves of the second coil body. Through the groove within the central bridge arrangement, the winding or wrapping wire in turn can be guided from one side to the other side of the coil without great outlay. A position orientation of the relevant coil body relative to the central bridge is also attained through the contact surfaces.

Other objects, advantages and salient features of the present invention will become apparent from the following detailed description, which, taken in conjunction with the annexed drawings, discloses a preferred embodiment of the present invention.

Brief Description of the Drawings

Referring to the drawings which form a part of this disclosure.

Detailed Description of the Invention

Figure 1:
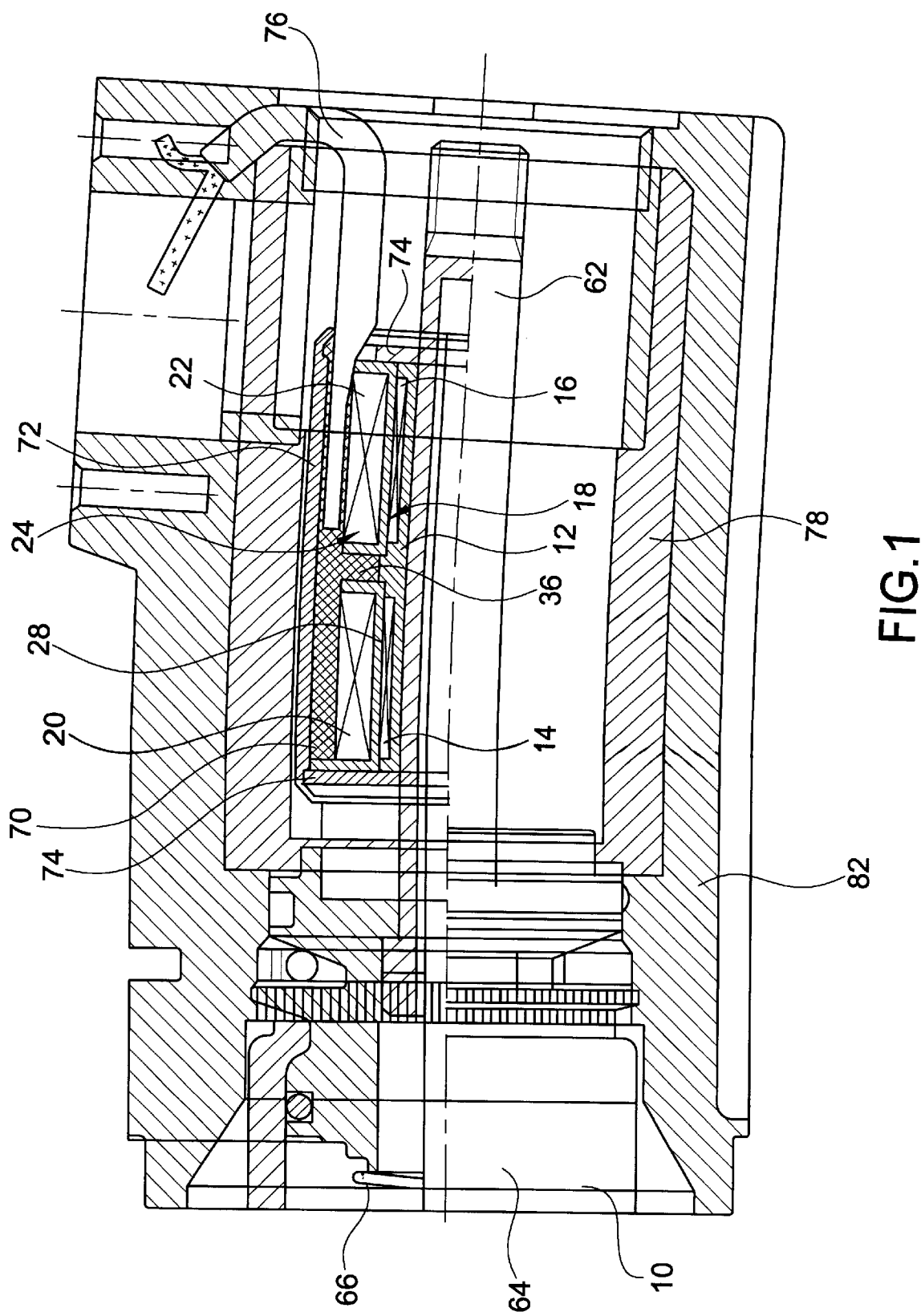
FIG. 1 is a partial side elevational view in section of a displacement sensor system according to an embodiment of the present invention.

The displacement sensor system 10 shown in FIG. 1 is for a solenoid coil. The coil, partially illustrated, includes coil windings 18 arranged in two areas in the housing of the main coil body 12, which windings form the primary winding. With formation of two secondary windings 20 and 22, an additional or secondary coil winding 24 is arranged mounted over each coil winding 14,16 of primary winding 18. As illustrated especially in the transverse section of FIG. 1, secondary windings 20 and 22 can have dimensions of greater magnitude in their diameter that the associated primary winding 18. Primary winding 18 is wound on main coil body 12. The two secondary windings 20 and 22 associated with the primary winding and mounted thereupon are mounted on a separate coil body 28, surrounding main coil body 12 and in contact with primary winding 18.

Figure 2A:
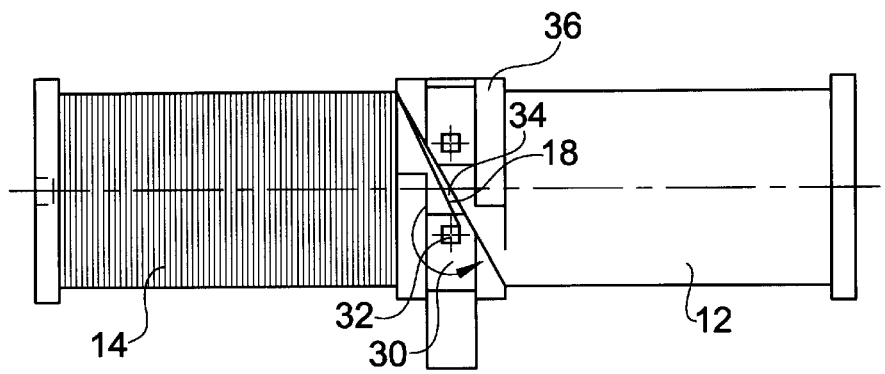
FIGS. 2A–C are side elevational views of the sensor displacement system of FIG. 1, in three successive stages of the winding process for the primary winding.
Figure 2B:
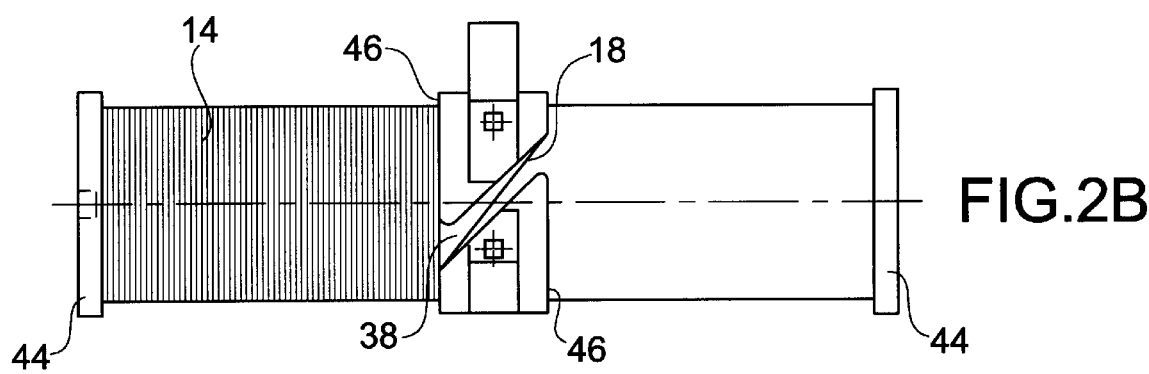
Figure 2C:
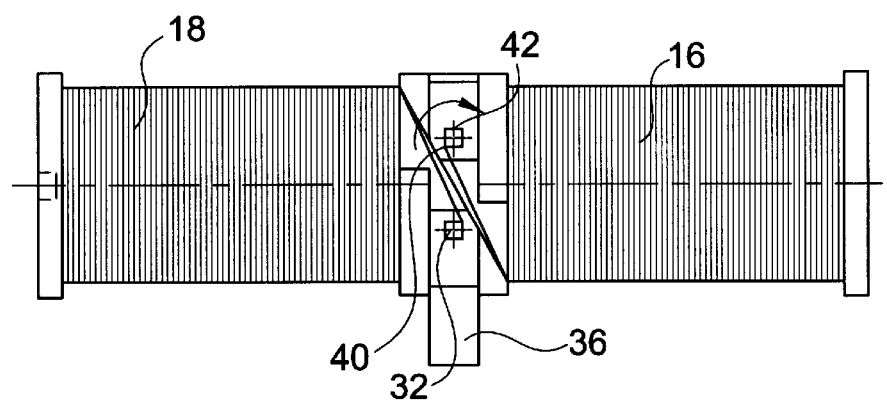
Figure 3:
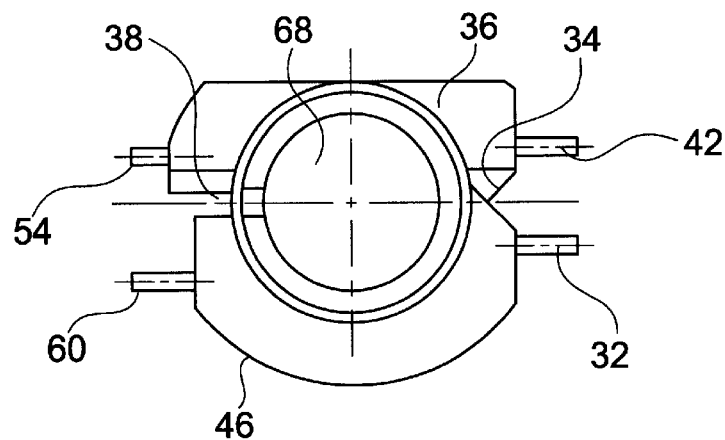
FIG. 3 is a front elevational view of the sensor displacement system of FIG. 1.

The construction of primary winding 18, with reference to FIGS. 2A–C, is executed as follows. First of all in a first stage, as shown in FIG. 2A, the winding starting point of primary winding 18 is located on the first toggle pin point 32, which is also indicated as a journal-type pin, where it is toggle-joined thereto. As seen in the viewing direction of FIG. 2A, the left area in the housing of main coil body 12 is then provided with the coil winding. In that manner, the winding starting point 30 of primary winding 18 is guided in a first groove 34 of a central bridge 36, which central bridge forms the middle part of main coil body 12. Subsequently, in a second stage, illustrated in FIG. 2B, the winding or wrapping wire is then run through a second groove 38 located diametrically opposite first groove 34 (cf. FIG. 3), in the direction of the area in the housing of main coil body 12 which until now has remained empty, whereby this area will then subsequently be wrapped.

The aforementioned windings can be executed in a plurality of layers. The winding terminal end 40 of the coil winding of primary winding 18, mounted in the second area in the housing, is affixed to the second toggle pin point 42, after winding terminal end 40 again has been guided partially through first groove 34 of central bridge 36. Main coil body 12, manufactured in this manner, with primary winding 18 illustrated in FIG. 2C which shows the third manufacturing stage. Coil windings 14 and 16 then extend in areas in the housing separated into several layers between the two end flanges 44 of main coil body 12 and the contact surfaces 46 of central bridge 36 associated with and arranged opposite end flanges 44. As shown particularly by the frontal view of central bridge 36, first groove 34 is configured as triangular in transverse cross section; and second groove 38 is configured as rectangular in transverse cross section. Both grooves 34 and 38 open outward into the surrounding environment.

In another method or manufacturing stage then for the production of the relevant symmetry windings 20 and 22, the additional or second coil body 28 is composed of two symmetrically constructed body halves 48 and 50. Additional coil body 28 can be attached to main coil body 12 with its two coil windings 14 and 16 of the primary winding 18 at the two ends, in other words over its end flanges 44. The body halves 48 and 50 making up two winding areas in the housing are secured in their position by means of a position securing mechanism (not shown) retaining them against rotation following end thrust on main coil body 12 opposite them. In addition the interior abutting flange of body halves 48 and 50 is interrupted with a groove passing all the way through, which, with grooves 34 and 38 in the central bridge 36, forms a common groove passage for the execution of the winding. Consequently, the secondary winding or wrapping wire can also be guided from one coil side or from one body half 48 in the direction of the opposite half 50 without interruption. In particular, body halves 48 and 50 can be constructed as snapping or catching parts, which without great manual manipulation or pressure, can be snapped onto and detached from main coil body 12.

Figure 4A:
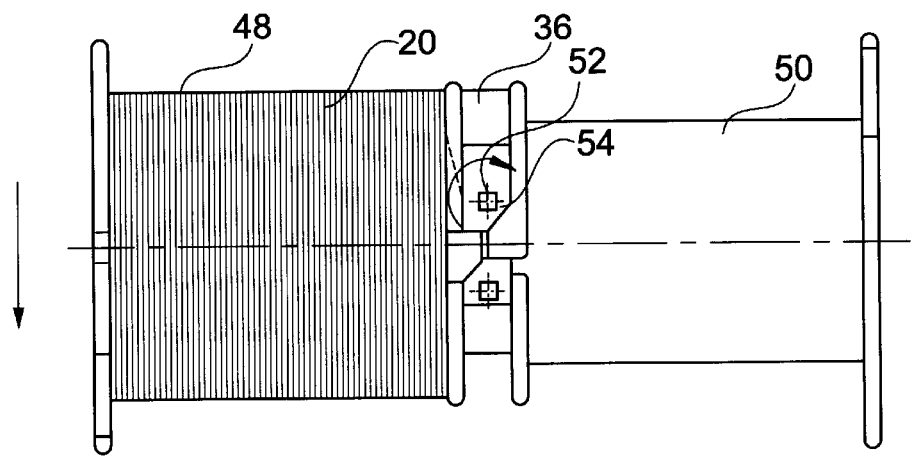
FIGS. 4A–C are side elevational views of the sensor displacement system of FIG. 1 in three successive stages of the winding process for the secondary windings.
Figure 4B:
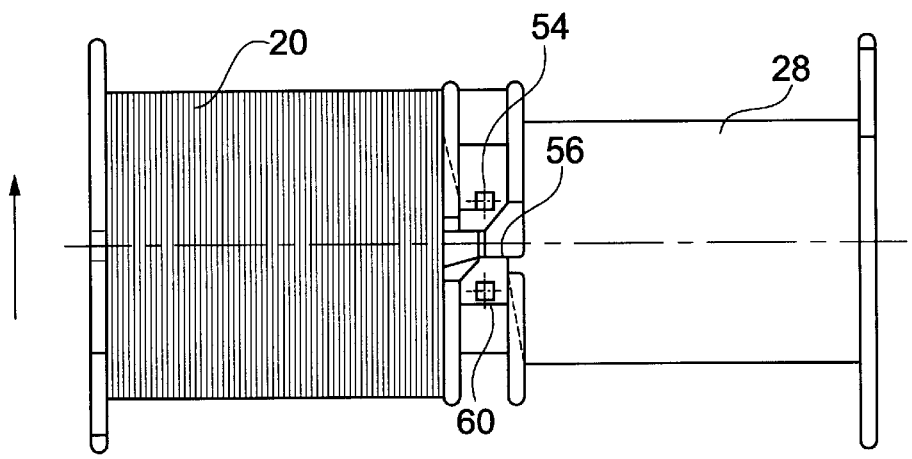

After body halves 48 and 50 upon formation of the additional coil body 28 are thrust onto main coil body 12 with its primary winding 18 and at the front are found in contact with the associated contact surfaces 46 of central bridge 36, then as shown in FIG. 4A, the winding starting point 52 of the first secondary winding 20 is affixed to the third toggle pin point 54. This third toggle pin point 54 is likewise a component part of central bridge 36, as shown particularly in FIG. 3. The direction of rotation for the winding in the area in the housing of first body half 48 is shown at the left of FIG. 4A with an arrow. Following the winding or wrapping of body half 48, secondary winding or wrapping wire, as shown in FIG. 4B, is passed over through a slot guide 56 into the other body half 50 and the resulting area in the housing is wrapped. The direction of rotation for the winding or wrapping of the area in the housing in FIG. 4B is again shown on the left side with an arrow.

Figure 4C:
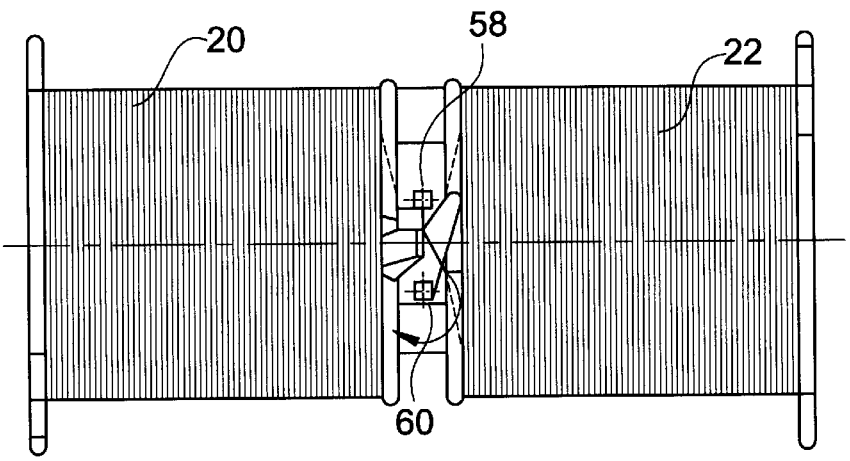

After both secondary windings 20, 22 are assembled on the other coil body 28, the winding terminal end 58 is affixed to the fourth toggle pin point 60 by an enveloping winding. A secondary winding arrangement manufactured in such a manner is represented in FIG. 4C. As shown particularly in FIG. 3, the relevant toggle pin points 32 and 42 of primary winding 18, as well as the toggle pin points 54 and 60 of the relevant secondary winding 20, 22, are arranged in pairs diametrically opposite one another and assembled preferably of one piece with and mounted on central bridge 36. To be precise, the relevant toggle pin points 32, 42, 52 and 60 are formed by the relevant winding or wrapping wire wound around projecting fixing journals (cf. FIG. 3). When making use of the contacting provided by secondary winding 20 connecting with secondary winding 22, these both can be manufactured having the required precision of performance and using a continuous winding process, so that separate contacting procedures can be deleted.

For mechanical adjustment of the zero or neutral point, an arrangement can be provided with the additional coil body 28 with its body halves 48, 50 being movable into predeterminable positions on main coil body 12 with its primary winding 18. As shown especially in the longitudinal section of FIG. 1, main coil body 12 is penetrated by a core rod 62. Core rod 62 cooperates with the plunger-like solenoid part 64 in countering the application of force from a compression spring 66 in the traditional manner, and thus, need not be explained in greater detail. As especially shown in FIG. 3, the central recess 68 of main coil body 12 is also constructed to be circular in cross section in the area of its central bridge 36 in order to receive the cylindrical core rod 62. The two secondary windings 20, 22 are surrounded on the exterior by a cylindrical covering 70. Covering 70 is then surrounded by an iron jacket 72 on the outside. Iron jacket 72 is rolled inward at its two opposite longitudinal ends, and thus, holds the coil arrangement between flange segments 74 arranged at the front end. A frontal electric contact 76 is then generated, which supplies the pulsating auxiliary voltage to primary winding 18. Detection of the measured value on secondary windings 20, 22 is facilitated with this arrangement. The entire displacement sensor system is arranged in a displacement sensor housing 78, which allows for connection at the front with a solenoid coils housing 80.

With the displacement sensor system according to the present invention, it is guaranteed that the output signal can be modified linearly to indicate the range of displacement of core rod 62. Outside fields of disturbance, for example, those generated by magnetic leak or scatter fields or the like, cannot negatively influence the signal while being executed by the present arrangement. Furthermore, it is guaranteed that the relationship of measuring segment to the length of the displacement sensor system is of as great magnitude as possible, and consequently, is favorable. Furthermore, the arrangement of the present invention guarantees that the output signal, and if necessary, mechanically adjustable zero or neutral point, are modified upon change of temperature only within very narrow limitations. Consequently, temperature changes do not unfavorably influence the results of measurement.

While a particular embodiment has been chosen to illustrate the invention, it will be understood by those skilled in the art that various changes and modifications can be made therein without departing from the scope of the invention as defined in the appended claims.

What is claimed is:

1. A displacement sensor system for a solenoid coil, comprising:
   a main coil body;
   first and second primary coil windings, arranged one behind another on said main coil body, forming a primary winding;
   first and second secondary coil windings, mounted over said first and second primary coil windings, forming a secondary winding; and
   a central bridge in a longitudinal middle of said main coil body, said central bridge having diametrically opposing pairs of toggle pin points for starting points and terminal ends of said primary and secondary windings.

2. A displacement sensor system according to claim 1 wherein
   said first and second primary coil windings are wound on said main coil body; and
   said first and second secondary coil windings are arranged on a second coil body surrounding said main coil body and contacting said primary winding.

3. A displacement sensor system according to claim 2 wherein
   said second coil body comprises first and second separate halves which can be attached to said main coil body with said first and second primary coil windings thereon at opposite ends of said main coil body.

4. A displacement sensor system according to claim 3 wherein
   said toggle pin points comprise bearing journals enveloped by wires forming said coil windings.

5. A displacement sensor system according to claim 4 wherein
   said central bridge comprises wire guide grooves, and contacts surfaces on both sides thereof for said first and second halves of said second coil body.

6. A displacement sensor system according to claim 5 wherein
   said first and second halves of said second coil body are slidable relative to said main coil body for mechanical adjustment of a zero or neutral point.

7. A displacement sensor system according to claim 2 wherein
   said second coil body is slidable relative to said main coil body for mechanical adjustment of a zero or neutral point.

8. A displacement sensor system according to claim 3 wherein
   said central bridge comprises wire guide grooves, and contacts surfaces on both sides thereof for said first and second halves of said second coil body.

9. A displacement sensor system according to claim 8 wherein
   said first and second halves of said second coil body are slidable relative to said main coil body for mechanical adjustment of a zero or neutral point.

10. A displacement sensor system according to claim 3 wherein
    said first and second halves of said second coil body are slidable relative to said main coil body for mechanical adjustment of a zero or neutral point.

11. A displacement sensor system according to claim 4 wherein
    said first and second halves of said second coil body are slidable relative to said main coil body for mechanical adjustment of a zero or neutral point.

12. A displacement sensor system according to claim 1 wherein
    said main coil body at least partially surrounds a core rod cooperating with a solenoid part of the solenoid coil and generating a voltage modification in said secondary coil winding upon displacement of said core rod in said main coil body.

13. A displacement sensor system according to claim 1 wherein
    a pulsating auxiliary voltage is applied to said first and second primary coil windings.

14. A displacement sensor system according to claim 1 wherein
    said first and secondary coil windings are surrounded by a covering; and said covering is surrounded by an iron jacket on an exterior periphery thereof.

15. A displacement sensor system according to claim 1 wherein
    said toggle pin points extend radially outwardly from said central bridge.

* * * * *